United States Patent [19]

Levine

[11] 3,925,657

[45] Dec. 9, 1975

[54] INTRODUCTION OF BIAS CHARGE INTO A CHARGE COUPLED IMAGE SENSOR

[75] Inventor: Peter Alan Levine, Kendall Park, N.J.

[73] Assignee: RCA Corporation, New York, N.Y.

[22] Filed: June 21, 1974

[21] Appl. No.: 481,746

[52] U.S. Cl. .................. 250/211 J; 357/24; 357/32

[51] Int. Cl.$^2$ .......................................... H01J 39/12

[58] Field of Search ......... 250/211 R, 211 J, 213 R, 250/213 ST, 578; 357/24, 31, 32; 178/7.1, 7.6, 6.8; 315/10, 11, 12; 340/173 LM, 173 LS, 173 LT

[56] References Cited

UNITED STATES PATENTS

| | | | |
|---|---|---|---|
| 3,560,756 | 2/1971 | Labuda | 250/211 J |
| 3,576,392 | 4/1971 | Hofstein | 178/7.1 |
| 3,716,740 | 2/1973 | Crowell et al. | 357/31 |
| 3,746,908 | 7/1973 | Engeler | 178/6.8 |
| 3,748,549 | 7/1973 | Milch et al. | 357/31 |
| 3,841,928 | 10/1974 | Takemoto et al. | 315/11 |

*Primary Examiner*—James W. Lawrence
*Assistant Examiner*—D. C. Nelms
*Attorney, Agent, or Firm*—H. Christoffersen; S. Cohen

[57] ABSTRACT

Bias or background charge (sometimes known as "fat zero" charge) is introduced into a charge coupled device (CCD) image sensing array by applying radiation to the substrate through the surface opposite the one receiving the image. For example, in the case of a front surface illuminated array, bias light is projected through the rear surface of the substrate to introduce the background charge.

5 Claims, 6 Drawing Figures

INTRODUCTION OF BIAS CHARGE INTO A CHARGE COUPLED IMAGE SENSOR

A limitation on the performance of surface channel CCD arrays, shift registers, and the like is the incomplete charge transfer due to the trapping of charge by "fast interface states" existing in the forbidden gap at the semiconductor-insulator interface. It is well-known in the art that such transfer loss can be considerably reduced by operating in the so called "fat zero" mode. In this mode, a relatively small background charge level is introduced into the register, array, or the like, prior to the introduction of signal intelligence. When operating in the fat zero mode, the net amount of signal which can be trapped during the transfer of a signal from one storage well to the next adjacent well, that is, between the time the signal is supplied to a potential well and the time it is subsequently removed from the well in response to a clock pulse, is relatively low. The reason is that the interface traps are almost completely filled during each shift cycle and the amount of trapping which does occur is small and is about the same during each shift cycle.

In the operation of CCD devices such as shift registers, fat zero's are introduced electrically by shifting a relatively small charge signal into the array, rather than no charge signal, to represent the absence of signal intelligence. In the operation of a CCD image sensing array, fat zero's are introduced optically. A small light source is employed to illuminate the array through the same surface as receives the radiant energy image. However, for reasons discussed briefly later, the light source must be placed along side of the optical system through which the image is projected and accordingly illuminates the array non-uniformly.

In the system of the present invention, the CCD imager is illuminated not through the same surface as receives the image but rather through the opposite surface. In the case of a front surface illuminated CCD array, bias radiation is projected onto the rear surface and in the case of a back surface illuminated array, bias radiation is projected through the front surface.

The invention is illustrated in the drawing in which.

Figure 1:
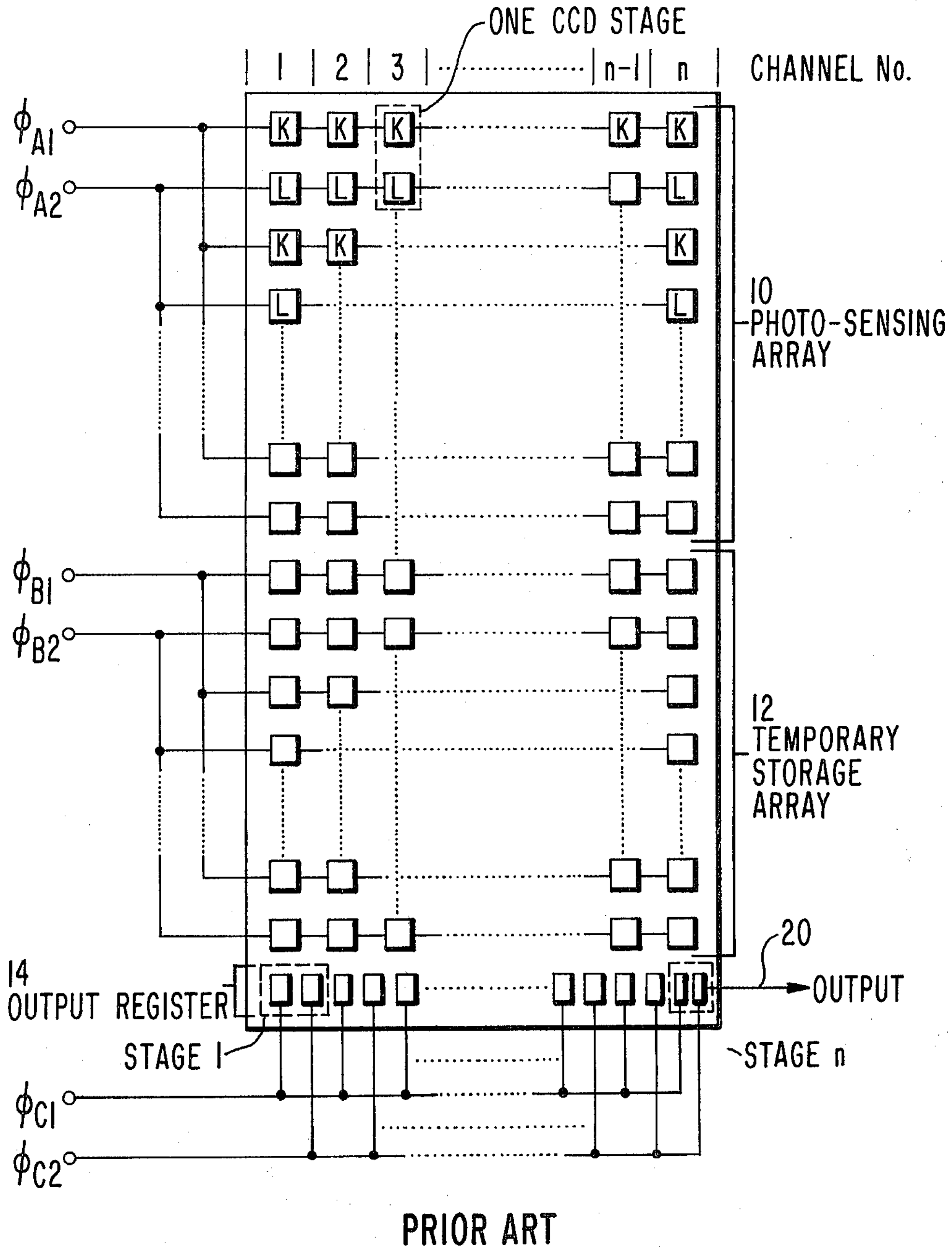
PRIOR ART Fig. 1.
FIG. 1 is a schematic showing of a known CCD image sensing system.
Figure 6:
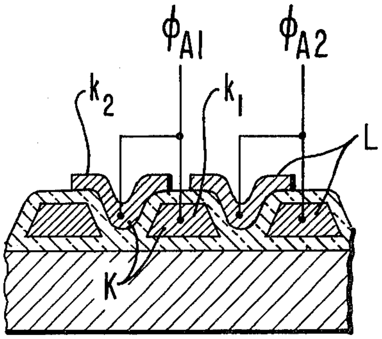
FIG. 6 is a more realistic showing of the electrodes in a two phase imager such as shown in FIG. 1.

The known system of FIG. 1 includes a photosensing array 10, a temporary storage array 12 having the same number of locations as the array 10, and an output register 14 having a number of stages equal to the number of locations in a row of the array 10. Elements 10, 12 and 14 are sometimes known as the A, B and C registers, respectively. Each stage or location comprises two electrode means K and L. As shown in FIG. 6, an electrode means such as K may, in a two phase system, comprise a pair of electrodes $k_1$ and $k_2$. Electrode $k_1$ is formed of polysilicon and $k_2$ of aluminum and both are driven by the same voltage phase $\phi_{A1}$. Electrode means L is similar and driven by the other phase $\phi_{A2}$.

During the so-called "integration" time, comparable to the exposure time in the camera art, the electrode means K may be held at a voltage level to cause depletion regions to form in the substrate. Electrode means L may be held at a voltage level to form potential barriers between the depletion regions. Channel "stops," not shown explicitely, may be present to prevent the charge in one channel from passing to the next channel. Under those conditions, the radiant energy image, such as a light or an infrared image, as examples, projected onto the array causes the generation and accumulation of charge signal at the respective photosensing locations. The number of charge carriers which accumulate at each location during the integration time is proportional to the amount of radiant energy reaching that location and this, in turn, is proportional to the radiation intensity and the duration of the integration time. The array 12 and register 14 are masked to prevent radiation from reaching these structures.

At the termination of the integration time, the charge carriers are shifted from the photosensing array 10 to the temporary storage array 12. The shifting is accomplished, in the example illustrated, by the two sets of two phase voltages $\phi_{A1}$, $\phi_{A2}$ and $\phi_{B1}$, $\phi_{B2}$. (Three or four phase operation also would be possible.) During this shifting operation, $\phi_{A1} = \phi_{B1}$ and $\phi_{A2} = \phi_{B2}$. After the information detected by the array 10 has been shifted in its entirety to the temporary storage array 12, it is shifted, a line (row) at a time, from the temporary storage array 12 to the output register 14. During the shifting of signals from array 12 to register 14, the photosensing array 10 may be placed in condition again to receive a light image.

The shifting of the contents of array 12 into the register 14 is accomplished by the $\phi_{B1}$, $\phi_{B2}$ two-phase voltages. After each line of information is shifted, in parallel, from array 12 to output register 14, it is then shifted in serial fashion from the output register to the output lead 20 by the two-phase voltages $\phi_{C1}$, $\phi_{C2}$. These, of course, are at a much higher frequency than the two phase voltages $\phi_{B1}$, $\phi_{B2}$ to insure that register 14 is emptied before the next line of information arrives.

In practice, the contents of the photosensing array 10 may be shifted into the temporary storage array 12 during the period corresponding to the vertical blanking time in commercial television, that is, during a period such as 900 microseconds. The output register 14 may be loaded in say 10 microseconds, the horizontal retrace time, and its contents shifted to the output terminal a bit at a time, during the horizontal line time - 50 microseconds.

There are a number of ways in which light may be received in an array such as 10. For example, the charge coupled electrodes may be formed of an opaque metal such as aluminum, and the radiant energy, such as light, may be received through the upper surface (the surface over which the electrodes are located) and may reach the silicon substrate through the spaces between the aluminum electrodes. Alternatively, some of the electrodes may be formed of aluminum and others of polysilicon (as shown in FIG. 6) and the radiant energy image applied to the panel through the polysilicon electrodes. There are also other possible electrode configurations.

It is also possible to illuminate the panel through the rear surface. Here the substrate may be thinned at the location at which light is to be received as in FIG. 4 and may be formed with a relatively thin semiconductor layer (not shown) to prevent surface recombination. The electrode structures would be the same as discussed above.

Figure 2:
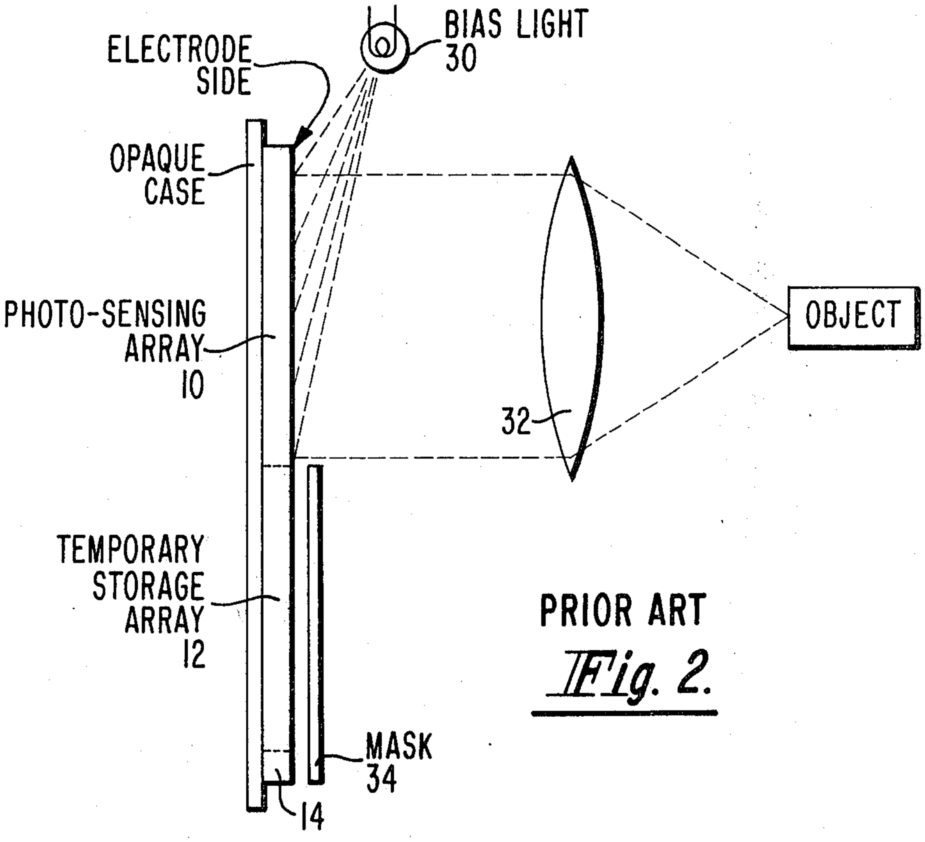
PRIOR ART Fig. 2.
FIG. 2 is a schematic showing of a known method for applying bias light to a system such as shown in FIG. 1.

All of that which has been described up to this point in connection with FIG. 1 is conventional. It is also known that it is desirable to introduce a background charge level for reasons already discussed. The system employed is shown in FIG. 2. It includes a bias light source 30 located on one side of the CCD imager. It is necessary to so locate the light for two reasons. One is that the optics of the system, represented by the single lens 32 in FIG. 2, is relatively close to the image receiving surface of the array. The other is to prevent the bias light source 30 from interfering with the image being projected onto the array.

While the system shown in FIG. 2 does work, it does have a disadvantage, namely that the bias light intensity is non-uniform. The portion of the array close to the light source receives bias light at a greater intensity than the portion of the array further from the light source. The results in a corresponding non-uniformity in the charge signal information read out of the array.

Figure 3:
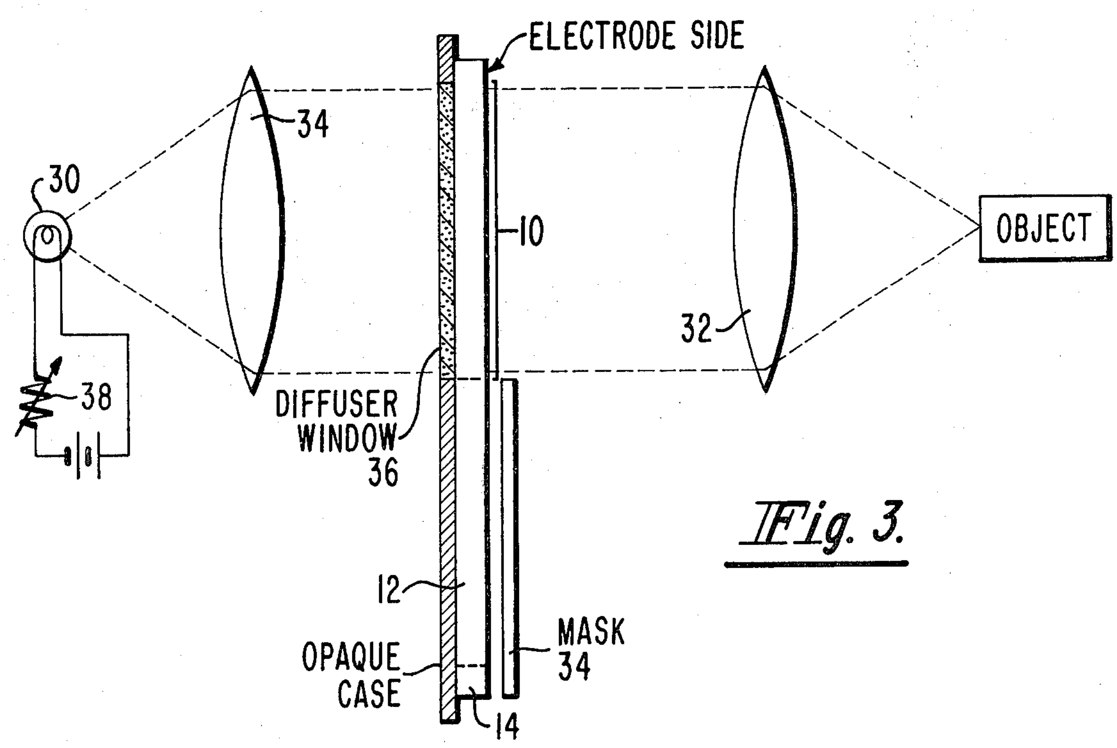
FIG. 3 is a schematic showing of one embodiment of the present invention.

FIG. 3 illustrates a solution to the problem above according to one embodiment of the present invention. The bias light is projected onto the CCD image sensing array 10 through the surface opposite the one receiving the image. The image is projected through the front surface of the array, that is, through the surface of the array carrying the electrodes. In the case of 3 phase system, the electrodes may all be opaque and the light will then reach the substrate through the gaps between the electrodes. In the case of a two phase system, some of the electrodes may be polysilicon which is relatively transparent and other of the electrodes aluminum which is opaque, or all of the electrodes may be polysilicon. In these cases, light reaches the substrate through the polysilicon electrodes. Other alternatives are also possible.

The bias light from source 30 is projected through a projection system, illustrated schematically by the single lens 34, and through a translucent light diffuser 36, onto the rear surface of the array 10. The light is chosen to be of a type to which the substrate of the CCD system is relatively transparent. For example, in the case of a silicon substrate, the source of light 30 should be one which includes a substantial component of infrared light. An ordinary incadescent light bulb is, for example, quite suitable. As an alternative, a light emitting diode which operates in the infrared region is suitable.

The light from source 30 can be at a relatively low level. Preferably, the light control circuit includes a means such as rheostat 38 for adjusting the light intensity. The bias light may be on continuously.

Figure 4:
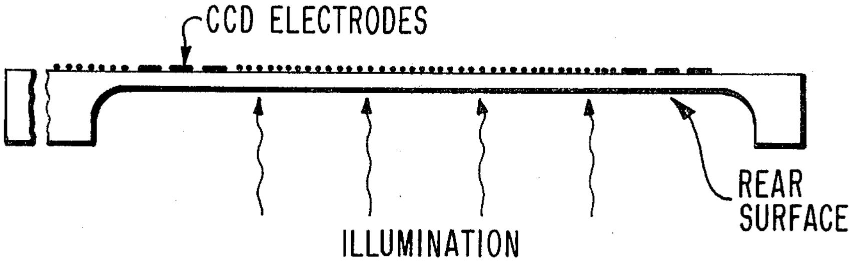
FIG. 4 is a schematic showing of a back surface illuminated CCD imager.

The present invention is also operative with a rear surface illuminated CCD imager such as illustrated in FIG. 4. Here the silicon substrate is thinned and the image is projected onto the rear surface of the substrate. (The rear surface may include a thin film which forms a region for lessening the tendency of surface recombinations to occur.) The CCD electrodes are on the front surface; that is, on the surface opposite from that receiving the illumination and are shown only schematically in FIG. 4.

Figure 5:
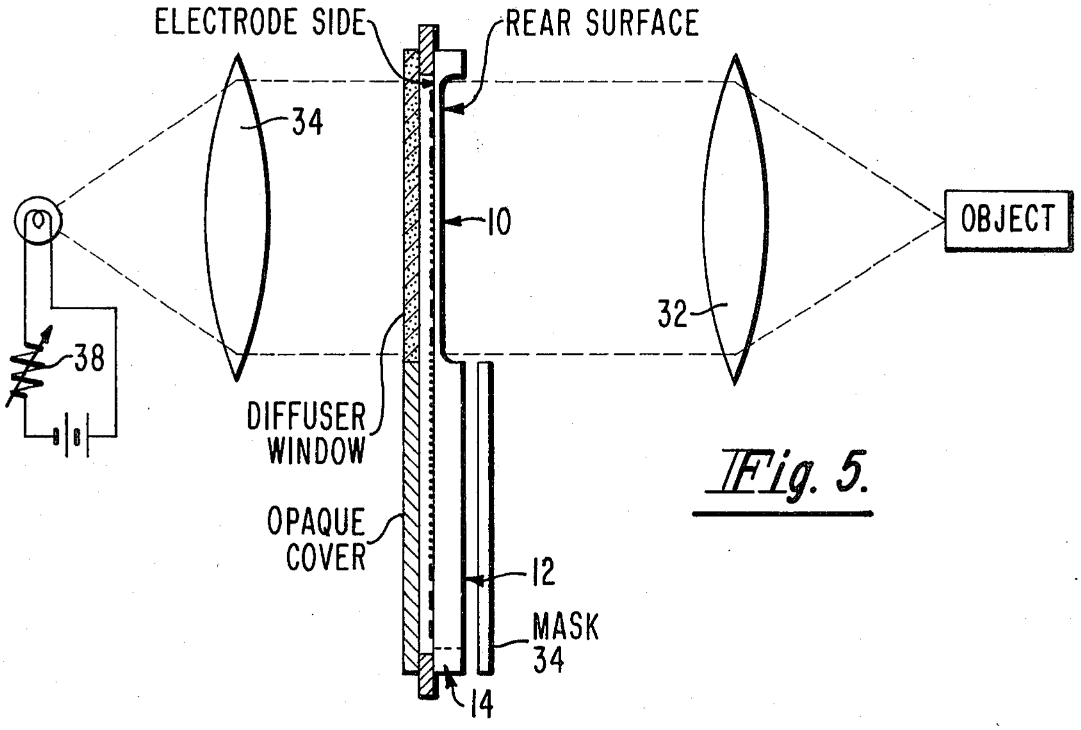
FIG. 5 is a schematic showing of a second embodiment of the present invention, this one employing a back surface illuminated CCD imager.

FIG. 5 shows the complete system. It is substantially identical to the FIG. 3 system except for the orientation of the CCD imager. The imager now receives the image through the rear surface and it receives the bias light through the front surface.

While in the arrangement of FIG. 3 it is important that the substrate be somewhat transparent to the biasing light, this is not essential in FIG. 5. In FIG. 5, the bias light reaches the substrate surface at which charge signals accumulate, through the gaps between adjacent electrodes (if the electrodes are opaque) or through the electrodes themselves (if the electrodes are transparent.) Therefore, the bias light causes the generation of electronhole pairs at the surface where the minority ones of these carriers are accumulated. While it is not necessary that the substrate be transparent to the light from source 30, the same kind of light can be employed in the FIG. 5 embodiment as in the FIG. 3 embodiment. The source of light can be an incandescent bulb or a light emitting diodes, as examples.

What is claimed is:

1. A method for introducing a background charge signal into a surface channel charge coupled device image sensing array having a front surface at which the charge transfer electrodes are located and having also a back surface, which array receives a radiant energy image through one of said surfaces, comprising the step of:

applying radiant energy illumination at a bias level which is uniform over the entire area of the surface on which the radiant energy illumination at said bias level impinges, through the other of said surfaces, said entire area on which said radiant energy illumination at said bias level impinges including an area corresponding to substantially the entire area of said one surface receiving said radiant energy image.

2. A method as set forth in claim 1 wherein the radiant energy image is applied to said front surface of said array, and wherein said radiant energy illumination at a bias level comprises illumination at a wavelength to which the substrate of the array is substantially transparent.

3. A method as set forth in claim 1 wherein the radiant energy image is applied to said back surface of said array and the bias level illumination is applied to said front surface of the array.

4. In a charge coupled image sensing system which includes a photosensing surface channel charge-coupled array having two opposite surfaces for accumulating charge signals in response to radiant energy excitation through one of its surfaces, said array including a substrate, an insulator on one surface of the substrate and electrodes over the insulator; a temporary storage charge coupled array coupled to the photosensing array for receiving said charge signals accumulated in the photosensing array, said temporary storage array being masked at its corresponding surface to prevent said radiant energy from exciting charge carriers therein, the improvement comprising:

means for introducing background charge into said photosensing array for filling the traps at the interface between said substrate and said insulator comprising means for illuminating said photosensing array at a fixed radiant energy bias level through the surface of said photosensing array opposite the one through which said radiant energy excitation is received and which bias level is uniform over said entire surface opposite the one through which said radiant energy excitation is received.

5. a charge-coupled image sensing system as set forth in claim 4, further including means for adjusting the amplitude of the radiant energy bias level.

* * * * *